(12) United States Patent
Haque et al.

(10) Patent No.: US 8,019,549 B2
(45) Date of Patent: Sep. 13, 2011

(54) EVENT-BASED POWER MANAGEMENT FOR SEISMIC SENSORS

(75) Inventors: Jamal Haque, Clearwater, FL (US); Keith A. Souders, Tampa, FL (US); Manuel I. Rodriguez, St. Petersburg, FL (US); Kimberly M. Knitt, Clearwater, FL (US)

(73) Assignee: Honeywell International Inc., Morristown, NJ (US)

( * ) Notice: Subject to any disclaimer, the term of this patent is extended or adjusted under 35 U.S.C. 154(b) by 446 days.

(21) Appl. No.: 12/331,763

(22) Filed: Dec. 10, 2008

(65) Prior Publication Data
US 2010/0145622 A1    Jun. 10, 2010

(51) Int. Cl.
G01V 1/28 (2006.01)
(52) U.S. Cl. ........... 702/14; 367/78; 367/136; 702/7; 702/9
(58) Field of Classification Search ........... 702/7, 9, 702/14, 141; 340/566, 854.7; 367/15, 18, 367/56, 136; 370/338; 709/224
See application file for complete search history.

(56) References Cited

U.S. PATENT DOCUMENTS

| | | |
|---|---|---|
| 3,074,636 A | 1/1963 | Baker et al. |
| 3,106,982 A | 10/1963 | Wade |
| 3,273,112 A | 9/1966 | Hobson |
| 3,296,587 A | 1/1967 | Baker |
| 3,302,745 A | 2/1967 | Ikrath |
| 3,302,746 A | 2/1967 | Ikrath |
| 3,638,178 A | 1/1972 | Stephenson |
| 3,922,663 A * | 11/1975 | Lubke et al. ............. 367/136 |
| 3,940,733 A | 2/1976 | Johnson et al. |
| 3,984,804 A | 10/1976 | Herring et al. |
| 4,078,620 A | 3/1978 | Westlake et al. |
| 4,091,366 A | 5/1978 | Lavallee |
| 4,209,783 A | 6/1980 | Ohyama et al. |
| 4,294,513 A | 10/1981 | Nelson et al. |
| 4,314,365 A | 2/1982 | Petersen et al. |
| 4,547,869 A | 10/1985 | Savit |
| 4,589,285 A | 5/1986 | Savit |
| 4,674,067 A | 6/1987 | Zemanek, Jr. |
| 5,051,965 A | 9/1991 | Poorman |
| 5,469,403 A | 11/1995 | Young et al. |

(Continued)

FOREIGN PATENT DOCUMENTS

WO    2008042774    4/2008

OTHER PUBLICATIONS

Briscoe, H. W. "Study of the Feasibility of Long-Range Seismic Communications." 1972. Bolt Beranek and Newman, Inc., Cambridge, MA.

(Continued)

*Primary Examiner* — John H Le
(74) *Attorney, Agent, or Firm* — Shumaker & Sieffert, P.A.

(57) ABSTRACT

A method of event-based power management for seismic sensors is disclosed. The method comprises measuring seismic activity with a seismic sensor and comparing the measured seismic activity from the seismic sensor against at least one criteria. When the measured seismic activity does not satisfy the at least one criteria, a signal processing circuit is maintained in a deactivated state. When the measured seismic activity satisfies the at least one criteria, the signal processing circuit is activated to analyze the measured seismic activity. The signal processing circuit enters a functional mode based on analyzing the measured seismic activity.

20 Claims, 3 Drawing Sheets

U.S. PATENT DOCUMENTS

| | | | |
|---|---|---|---|
| 5,515,509 | A | 5/1996 | Rom |
| 5,668,775 | A | 9/1997 | Hatteland |
| 5,757,728 | A | 5/1998 | Tenghamn et al. |
| 5,850,592 | A | 12/1998 | Ramanathan |
| 5,861,846 | A | 1/1999 | Minter |
| 5,924,499 | A | 7/1999 | Birchak et al. |
| 6,236,889 | B1 | 5/2001 | Soykan et al. |
| 6,274,863 | B1 | 8/2001 | Kersey |
| 6,308,137 | B1 | 10/2001 | Underhill et al. |
| 6,442,105 | B1 | 8/2002 | Tubel et al. |
| 6,469,639 | B2 | 10/2002 | Tanenhaus et al. |
| 6,583,729 | B1 | 6/2003 | Gardner et al. |
| 6,681,887 | B1 | 1/2004 | Kragh et al. |
| 6,724,319 | B1 | 4/2004 | Knaack et al. |
| 6,728,165 | B1 | 4/2004 | Roscigno et al. |
| 6,859,831 | B1 | 2/2005 | Gelvin et al. |
| 6,880,634 | B2 | 4/2005 | Gardner et al. |
| 6,928,030 | B2 | 8/2005 | Chamberlain et al. |
| 6,933,856 | B2 | 8/2005 | Schultz |
| 7,012,853 | B2 * | 3/2006 | Iseli et al. ......... 367/78 |
| 7,035,240 | B1 | 4/2006 | Balakrishnan et al. |
| 7,216,053 | B2 | 5/2007 | Rakkola et al. |
| 7,301,473 | B2 | 11/2007 | Shah et al. |
| 7,304,976 | B2 | 12/2007 | Mao et al. |
| 7,307,915 | B2 | 12/2007 | Kimball |
| 2002/0037737 | A1 | 3/2002 | Learned et al. |
| 2004/0006430 | A1 | 1/2004 | Harmon et al. |
| 2005/0047277 | A1 | 3/2005 | Chamberlain et al. |
| 2005/0254344 | A1 | 11/2005 | Barras |
| 2006/0262645 | A1 | 11/2006 | Van Baaren |
| 2007/0223306 | A1 | 9/2007 | Toennessen |
| 2007/0223307 | A1 | 9/2007 | Storteig et al. |
| 2007/0286022 | A1 | 12/2007 | Bull et al. |
| 2008/0021658 | A1 * | 1/2008 | Pavel et al. ......... 702/14 |
| 2008/0137476 | A1 | 6/2008 | Eick et al. |
| 2008/0159076 | A1 * | 7/2008 | Sicking et al. ......... 367/59 |
| 2008/0191871 | A1 | 8/2008 | Horak et al. |

OTHER PUBLICATIONS

Chen et al., "Source Localization and Beamforming," IEEE Signal Processing Magazine, Mar. 2002, pp. 1-9.

Chen et al., "Coherent Acoustic Array Processing and Localization on Wireless Sensor Networks," Proceedings of the IEEE, Aug. 2003, pp. 1154-1162, vol. 91, No. 8.

Stafsudd et al., "Analysis, Implementation, and Application of Acoustic and Seismic Arrays," ACTA Automatica Sinica, Nov. 2006, pp. 929-937, vol. 32, No. 6.

Werner-Allen et al., "Monitoring Volcanic Eruptions with a Wireless Sensor Network," Wireless Sensor Networks: Second European Workshop on Sensor Networks, Jan. 2005, pp. 108-120.

U.S. Appl. No. 12/392,499, titled "Communication in a Seismic Sensory Array", filed Feb. 25, 2009.

U.S. Appl. No. 11/868,272, titled "Acoustic Communication and Control for Seismic Sensors", filed Oct. 5, 2007.

Ammar et al., "Wireless Sensor Network Node with Asynchronous Architecture and Vibration Harvesting Micro Power Generator", "Joint sOc-EUSAI Conference", Oct. 2005, Publisher: TIMA Laboratory, Published in: Grenoble, France.

Calhoun et al., "Design Considerations for Ultra-Low Energy Wireless Microsensor Nodes", "IEEE Transactions on Computer", Jun. 6, 2005, vol. 54, No. 6, Publisher: IEEE.

Wills et al., "Low-Power Acoustic Modem for Dense Underwater Sensor Networks", "Proceedings of WUWNet '06", Sep. 25, 2006, Published in: Los Angeles, CA.

* cited by examiner

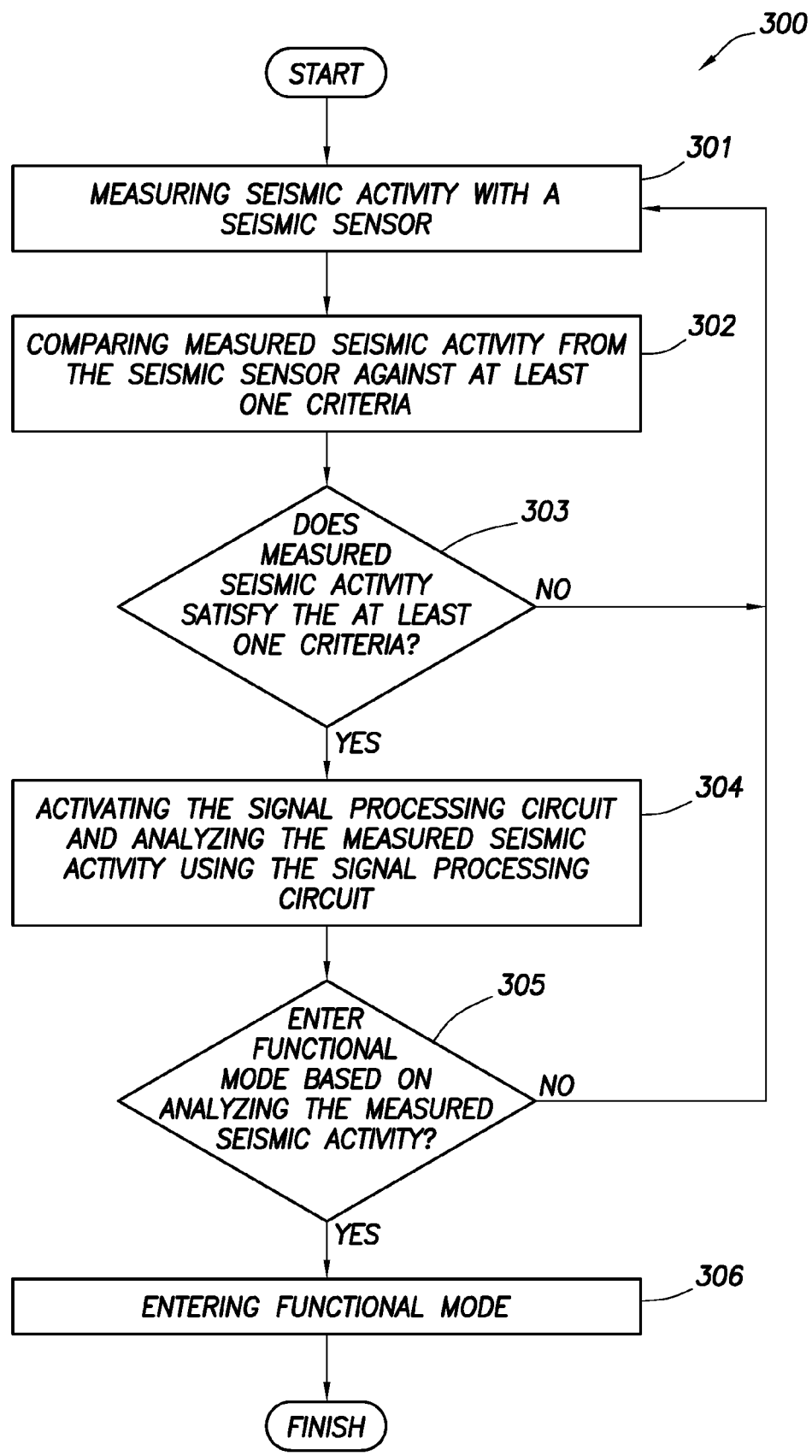

EVENT-BASED POWER MANAGEMENT FOR SEISMIC SENSORS

CROSS REFERENCE TO RELATED APPLICATION(S)

This application is related to commonly assigned U.S. patent application Ser. No. 11/868,272, filed on Oct. 5, 2007 and entitled "ACOUSTIC COMMUNICATION AND CONTROL FOR SEISMIC SENSORS" (the '272 application). The '272 application is incorporated herein by reference in its entirety.

BACKGROUND

Seismic sensors are detectors and receivers of seismic waves or waves of energy that travel through the Earth. Various signal detection and monitoring networks deploy arrays of these sensors for a variety of applications where the processing of seismic activity is required. Typically, communication between the sensors and a central data unit that processes the seismic activity is accomplished through 'hard-wired' connections such as electric cabling and fiber optic. In environments where these hard-wired connections are not feasible (for example, for secured or clandestine signal transmission purposes), alternate forms of communication between the sensors and the central data unit are necessary.

In addition, as the functions for these networks and sensor arrays not only increase in capability and function but become more remote in location, the operating environment of the sensors makes it difficult to provide sufficient electrical power to the sensors for continual detection of any seismic activity. For the effective operation of such a network, an effective use of electrical power is paramount for the success of any monitoring applications that employ these sensor array networks.

For the reasons stated above and for other reasons stated below which will become apparent to those skilled in the art upon reading and understanding the specification, there is a need in the art for improved power management for seismic sensors.

SUMMARY

The following specification provides for event-based power management for seismic sensors. This summary is made by way of example and not by way of limitation. It is merely provided to aid the reader in understanding some aspects of at least one embodiment described in the following specification.

Particularly, in one embodiment, a method of event-based power management for seismic sensors is provided. The method comprises measuring seismic activity with a seismic sensor and comparing the measured seismic activity from the seismic sensor against at least one criteria. When the measured seismic activity does not satisfy the at least one criteria, a signal processing circuit is maintained in a deactivated state. When the measured seismic activity satisfies the at least one criteria, the signal processing circuit is activated to analyze the measured seismic activity. The signal processing circuit enters a functional mode based on analyzing the measured seismic activity.

BRIEF DESCRIPTION OF THE DRAWINGS

These and other features, aspects, and advantages are better understood with regard to the following description, appended claims, and accompanying drawings where:

FIG. 3 is a flow diagram of an embodiment of a method of event-based power management for seismic sensors.

The various described features are drawn to emphasize features relevant to the embodiments disclosed. Like reference characters denote like elements throughout the figures and text of the specification.

DETAILED DESCRIPTION

Embodiments disclosed herein relate to event-based power management for seismic sensors and acoustic signal measurement devices. In one embodiment, the event-based power management disclosed herein is a function of the seismic activity recorded by the seismic sensors. Accordingly, methods and apparatus for intelligently capturing seismic "events of interest" with a seismic sensor from a source of acoustic energy, while managing and conserving battery power, are discussed in further detail below.

Figure 1:
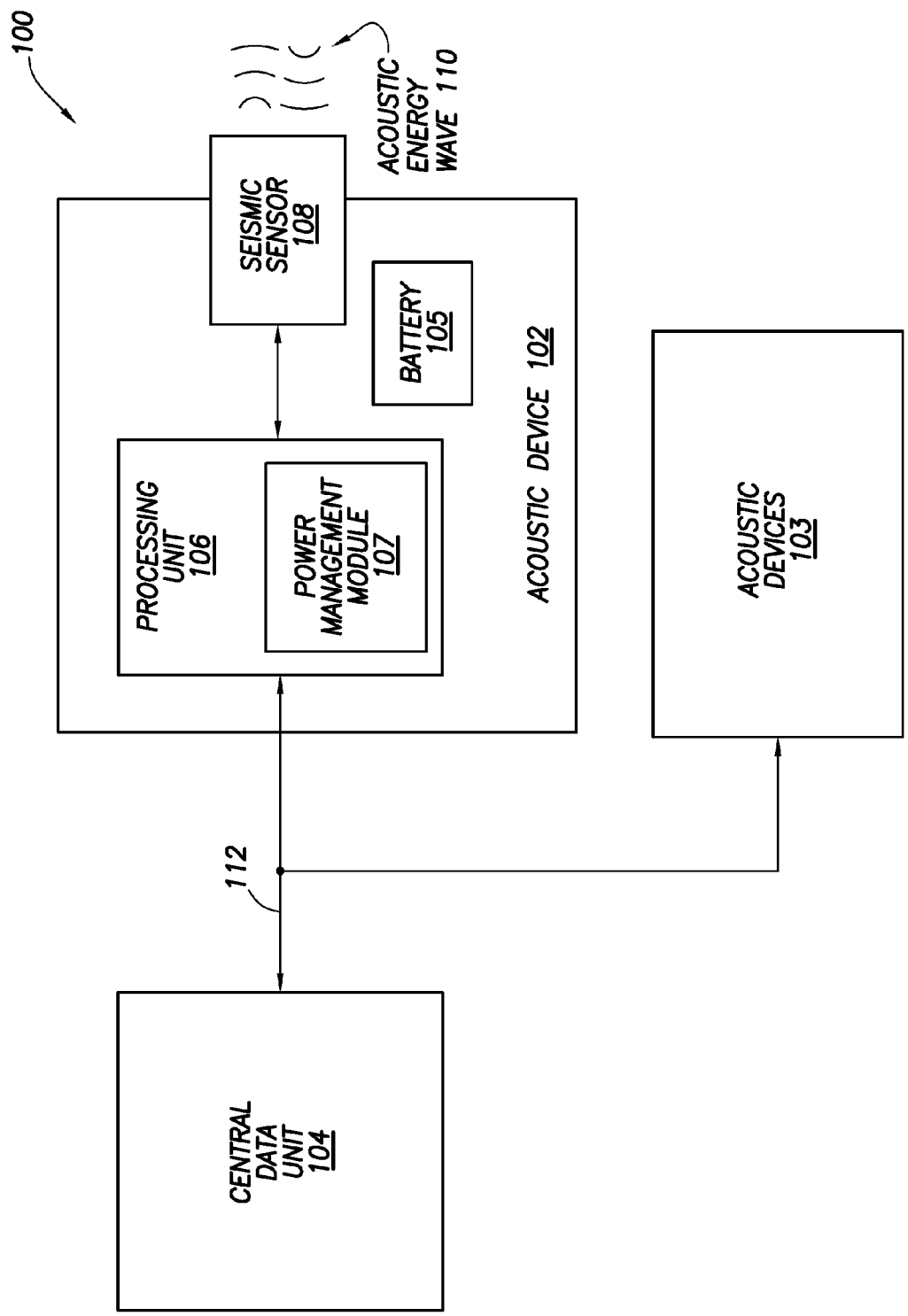
FIG. 1 is a block diagram of an embodiment of an electronic system having an acoustic device.

FIG. 1 is a block diagram of an embodiment of an electronic system 100 having an acoustic device 102 coupled to a central data unit 104 via a secure data link 112. For ease of description, a single acoustic device 102 is discussed below. It is understood that the system 100 is capable of accommodating any additional acoustic devices (shown at 103) each operating as described with respect to acoustic device 102 and in communication with the central data unit 104. The data link 112 is not limited to any particular communication medium or technology. For example, the data link 112 may comprises technologies such as, but not limited to, an electrical connection such as Ethernet or twisted pair copper wiring, a fiber optic connection, and a wireless network connection such as a wireless area network (WIFI) or a metropolitan area network (WIMAX) connection. Data communicated via the data link 112 includes, but is not limited to, communication and control data, sensor synchronization, sensor timing, and sensor health messages. Moreover, in one alternate embodiment, the acoustic device 102 re-routes messages to the additional alternate acoustic devices 103 to mitigate disruptions in communication traffic with the central data unit 104.

Acoustic device 102 comprises a processing unit 106 coupled to a seismic sensor 108, and a battery 105 for supplying power to acoustic device 102. In alternate implementations, the processing unit 106 comprises a processing device such as, but not limited to, a microprocessor, a microcontroller, a field-programmable gate array (FPGA), a field-programmable object array (FPOA), a programmable logic device (PLD), or an application-specific integrated circuit (ASIC).

As shown in FIG. 1, processing unit 106 includes logic and algorithms for implementing a power management module 107. Power management module 107 places the processing unit 106 in a low-power signal monitoring mode (i.e., a "sleep" mode) to reduce the amount of power drawn from battery 105 on a continual basis until an event associated with predetermined seismic criteria warrants additional signal processing. One process for determining when to shift processing unit 106 from the low-power mode into signal processing mode is discussed in further detail below with respect to FIG. 2.

Acoustic device 102 will operate in one of three modes. First is a monitoring mode, which uses the least power consumption. In this mode, seismic signals are monitored in specified frequency range(s). Second is a signal processing mode. In this mode, acoustic device 102 is awaken from the low-power sleep mode and detected seismic signals are analyzed for a level of interest. Third is a functional mode. In this mode, a seismic signal has been determined to be of interest and requiring an action, thus enabling the full operation of acoustic device 102. While in the monitoring mode, when a seismic signal is detected in a predefined frequency range, power management module 107 initiates processing unit 106 to begin analyzing the seismic signal using the signal processing mode with advanced signal processing algorithms. If the detected seismic signal is determined to be one of interest, the acoustic device 102 will transition to the functional mode and begin executing its designated tasks. If the processing unit 106 deems the detected seismic signal to be a false detection, then the processing unit 106 will return the acoustic device 102 to the low-power signal monitoring mode.

In operation, seismic sensor 108 will receive acoustic energy waves such as the acoustic energy wave shown generally at 110. From this wave energy, power management module 107 establishes a seismic noise floor representing ambient conditions. In the low power sleep mode, power management module 107 maintains operation of only those function in acoustic device 102 necessary to continue monitoring the wave energy. The power management module 107 determines whether to activate (that is, "wake-up") the processing unit 106 based on whether the seismic noise floor reaches a pre-defined event-based threshold level when the wave energy comprises a predetermined range of acoustic frequencies. One power management module 107 is triggered to "wake-up," the acoustic device 102 enters the signal processing mode.

For example, in one embodiment, the power management module 107, while in the low-power signal monitoring mode, monitors for the occurrences of one or more seismic activities received at the seismic sensor 108, for a "frequency trigger" (that is, an event of interest within the acoustic frequency range) and an "activity trigger" (that is, an event exceeding an activity threshold level). The frequency trigger and the activity level trigger serve as indications to the processing unit 106 that an event of interest is occurring and to activate the signal processing mode. In the signal processing mode, the processing unit 106 performs an analysis of the event of interest based on the measured seismic activity. In one implementation, one or both of the frequency trigger and activity trigger may be adjusted by commands issued from the central data unit 104.

Figure 2:
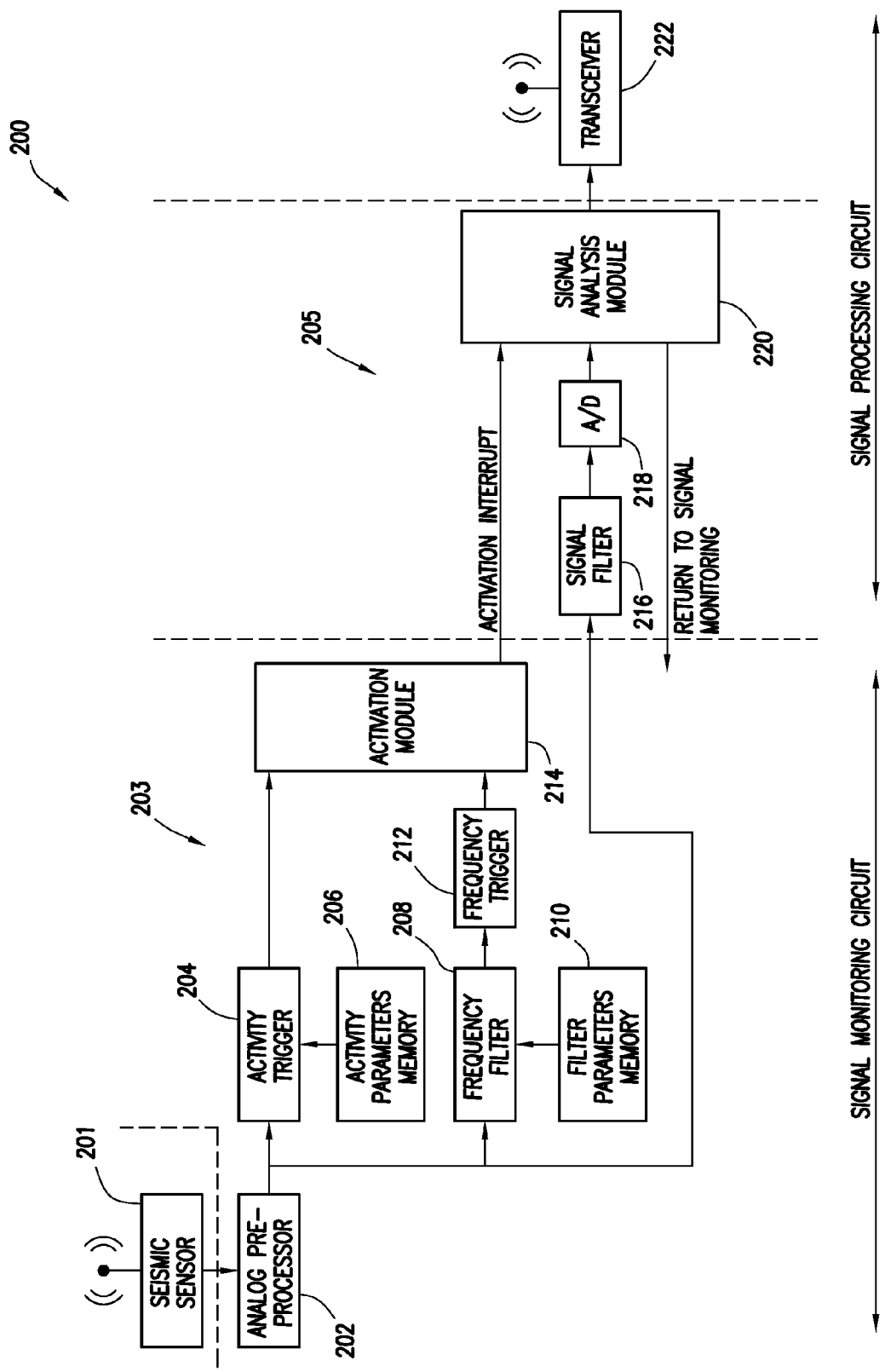
FIG. 2 is a block diagram of an embodiment of an acoustic device with a power management module for event-based power management.

FIG. 2 is a block diagram illustrating an embodiment of event-based power management for seismic sensors, shown generally at 200. The example embodiment described in FIG. 2 leverages from the capability of the acoustic device 102 of FIG. 1 to sense its deployed environment and establish a statistical seismic noise floor coming from spurious energy in the deployed area. Based on this noise floor, the acoustic device 102 establishes at least one threshold that is utilized by the power management module 107. In FIG. 2, a signal monitor (shown generally at 203 and also referred to herein as signal monitoring circuit or module 203) will act as a front end processor to trigger and activate a signal processor (shown generally at 205 and also referred to herein as signal processing circuit or module 205). In one embodiment, the signal processing circuit 205 performs a threat analysis which determines what further actions by the acoustic device 102 are selected. Selecting a response based on the threat analysis may include actions such as, but not limited to, activating other devices, such as an alarm, and initiating communication with the central data unit to provide information regarding the sensed event.

The operation of monitoring circuit 203 is based on detecting energy in both the time and frequency domains and comparing it to pre-programmed thresholds or other predetermined criteria. A filter (for example, a band pass or low Pass) is programmed to look for specific frequencies in the seismic spectrum (for example, 0-500 hz) and allows only certain frequencies of events to be passed through to initiating activation of the signal processing function 205. This pre-programmed range of frequencies of interest will allow acoustic device 102 to only operate when this particular activity occurs in the environment thus conserving valuable power resources.

The signal monitoring circuit 203 comprises an analog pre-processor 202 communicatively coupled to a seismic sensor 201 (such as the seismic sensor 108, for example), an activity trigger 204 coupled to the analog pre-processor 202, a frequency filter 208 coupled to the analog pre-processor 202, a frequency trigger 212 coupled to the frequency filter 208, and an activation module 214 coupled to the activity trigger 204 and the frequency trigger 212.

In operation, the analog pre-processor 202 receives seismic signals from the seismic sensor receiver 201. The analog pre-processor 202 comprises circuitry to provide signal conditioning of the seismic signals, such as, but not limited to, signal interfacing, amplification, and low pass filtering for the entire range of the frequencies of interest in the seismic spectrum. Next, activity trigger 204 and frequency filter 208 receive the pre-processed seismic signals from the analog pre-processor 202. The activity trigger 204 compares the signals against one or more programmable activity threshold values stored in activity parameters memory 206. Activity trigger 204 provides a first trigger signal to activation module 214. In one implementation, the activity trigger 204 provides the first trigger signal based on the intensity of a seismic event. Alternatively, the activity trigger 204 can provide the first trigger signal based on a prescribed number of re-occurring seismic activities at the activity threshold values.

Frequency filter 208 receives the pre-processed seismic signals from the analog pre-processor 202 and passes to frequency trigger 212 a filter spectrum of the signals based on one or more programmable filter parameters stored in filter parameters memory 210. For example, in one embodiment, filter parameters memory 210 stores frequency ranges indicative of seismic events of interest, and frequency filter 208 removes from the signals frequencies not within those frequency ranges. Frequency trigger 212 provides a second trigger signal to activation module 214 when it detects seismic energy in the frequency ranges indicative of seismic events of interest. Frequency trigger 212 triggers the activation module 214 once the same seismic activities are within the predetermined range of acoustic frequencies and at the frequency threshold value maintained in the frequency parameters module 210.

A trigger signal from both activity trigger 204 and frequency trigger 212 indicates to activation module 214 that an event of interest is occurring and to initiate activation of signal processing circuit 205. In one implementation, the activation module 214 activates signal processing circuit 205 when one of activity trigger 204 or frequency trigger 212 detect one or more of the seismic events of interest. In one implementation, activation module 214 activates signal processing circuit 205 when both the activity trigger 204 and frequency trigger 212 detect one or more of the seismic events of interest.

Activation module 214 provides an activation interrupt signal that activates signal processing function 205, shifting acoustic device 102 from monitoring mode into signal processing mode. Power management model 107 thus conserves energy by only activating signal processing circuit 205 when activation module 214 indicates that an event requires signal processing.

Signal processing circuit 205 comprises a signal analysis module 220, a signal filter 216 employing a sample-and-hold feature, and an analog to digital (A/D) converter 218. In one embodiment, signal analysis module 220 is implemented as discrete component within processing unit 106. In one embodiment, signal analysis module 220 is implemented as one or more algorithms executed by processing unit 106.

In operation, signal analysis module 220 receives the activation interrupt from activation module 214 and begins analyzing the pre-processed seismic signals from the analog pre-processor 202. For the embodiment shown in FIG. 2, the pre-processed seismic signals from the analog pre-processor 202 is filter by signal filter 216 and converted into a digital form by A/D 218 for input by signal analysis module 220. In one embodiment, signal filter 216 is configured as either a band pass filter or a low pass filter, to pass a frequency indicating seismic activity in an acoustic energy wave spectrum of interest. Signal filter 216 and frequency filter 208, may be, but are not necessarily configured to pass the same frequency ranges. In alternate embodiments, the functions of one or both of signal filter 216 and A/D 218 are integrated into signal analysis module 220.

Upon receiving the activation interrupt signal, the signal analysis module 220 begins processing the filtered occurrences of the seismic activities detected by seismic sensor 201. In one embodiment, the signal analysis module 220 analyzes the seismic events of interest based on criteria received from central data unit 104.

Based on the analysis performed by signal analysis module 220, acoustic device 102 may shift from signal processing mode back to monitoring mode when it determines no further actions are necessary to respond to the detected event. Alternatively, acoustic device 102 may shift from signal processing mode to functional mode when signal analysis module 220 determines that further actions are necessary.

As shown in FIG. 2, signal analysis module 220 is coupled to a transceiver 222 for communicating with central data unit 104. In the example embodiment of FIG. 2, transceiver 222 operates wirelessly to transmit and receive control and communication data from central data unit 104, or in alternate implementations, other acoustic devices 103. In one implementation, when acoustic device 102 enters the functional mode, signal analysis module 220 provides analyzed seismic activity that has been determined to be of interest to central data unit 104. In alternate embodiments, when acoustic device 102 enters the functional mode, acoustic device 102 responds to events of interest in other ways such as activating alarms or activating other external devices.

FIG. 3 is a flow diagram of an embodiment of a method 300 of event-based power management for seismic sensors. The method 300 addresses providing for power management for an acoustic device to reduce power, detect any activity of interest to the acoustic device, and activate signal processing circuitry within the acoustic device to process and transmit communication data concerning the detected activity of interest. In one implementation, a power management module within the acoustic device filters and detects specific seismic events for different seismic activities.

The method begins at 301 with measuring seismic activity with a seismic sensor. Initially the measuring is performed while maintaining the device in a in a low-power signal monitoring mode. This is achieved by deactivating advanced signal processing circuitry not identified as necessary for basic signal monitoring. The method proceeds to 302 with comparing measured seismic activity from the seismic sensor against at least one predetermined criteria. The acoustic device monitors an area adjacent to the acoustic device with a seismic sensor for sensing seismic activity within a predetermined range of acoustic frequencies that meet the criteria. In one embodiment, comparing involves filtering an acoustic energy wave received at a seismic sensor of the acoustic device for the seismic activity within the predetermined range of acoustic frequencies. In one embodiment, the at least one predetermined criteria is based on a frequency threshold and an activity threshold. In alternate embodiments, the activity threshold may indicate a threshold intensity, duration (time) or number of event occurrences. In one implementation, this comparison is based on a prescribed period of time that the seismic activity is detected within the predetermined range of acoustic frequencies.

When the measured seismic activity does not satisfy the at least one criteria (determined at block 303), the method returns to 301 to measuring seismic activity with a seismic sensor while maintaining the signal processing circuitry in a deactivated state.

When the measured seismic activity satisfies the at least one criteria (determined at block 303) the method proceeds to 304 with activating the signal processing circuit and analyzing the measured seismic activity using the signal processing circuit.

In one embodiment, analyzing the measured seismic activity further comprises proceeding to 306 with entering a functional mode based on analyzing the measured seismic activity. In other words, analyzing the measured seismic includes determining whether the measured seismic activity meets one or more action thresholds (shown at 305). The method determines whether the measured seismic activity represents an event that warrants a shift into the device's functional mode. In one embodiment, action thresholds are based on whether the analyzed activity falls within a prescribed range of acoustic frequencies or whether there are continuing occurrences of the event of interest.

In one embodiment, based on the analysis of the measured seismic activity, the method returns to block 301 to shift from signal processing mode back to low-power monitoring mode. This would occur, for example, when analyzing determines no further actions are necessary to respond to the detected event. Alternatively, when analyzing determines that further actions are necessary, the method proceeds to 307 with entering the functional mode.

In one embodiment, entering function mode further comprises transmitting a message indicative of the measured seismic activity or otherwise based on the event of interest. In one implementation, entering function mode further comprises recording the continuing occurrences of an event of interest at the acoustic device and transferring, between a central data unit and the acoustic device, communication and control data for the acoustic device comprising the analyzed event of interest information as detected by the seismic sensor. In a similar implementation, the acoustic device reconfigures the event-based threshold level and the prescribed acoustic frequency level using the control and communication data transfer between the seismic sensor and the central data unit.

The methods and techniques described herein may be implemented in a combination of digital electronic circuitry and can be realized by hardware, executable modules stored on a tangible computer readable medium, or a combination of both.

In addition to any means discussed above, means available to implement components of embodiments include, but are not limited to, digital microprocessors, controllers, state machines, or similar processing devices. Therefore other embodiments of the present invention are program instructions resident on computer readable media which when implemented by such controllers, implement embodiments of the present invention. Computer readable media are physical devices which include any form of computer memory, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL). Any of the foregoing may be supplemented by, or incorporated in, specially-designed application-specific integrated circuits (ASICs).

An apparatus embodying these techniques may include appropriate input and output devices, a programmable processor, and a storage medium tangibly embodying program instructions for execution by the programmable processor. A process embodying these techniques may be performed by the programmable processor executing a program of instructions that operates on input data and generates appropriate output data. The techniques may be implemented in one or more programs that are executable on a programmable system including at least one programmable processor coupled to receive data and instructions from (and to transmit data and instructions to) a data storage system, at least one input device, and at least one output device. Generally, the processor will receive instructions and data from at least one of a read only memory (ROM) and a random access memory (RAM).

This description has been presented for purposes of illustration, and is not intended to be exhaustive or limited to the embodiments disclosed. Variations and modifications may occur, which fall within the scope of the following claims. Therefore, it is manifestly intended that this invention be limited only by the claims and the equivalents thereof.

What is claimed is:

1. A method of event-based power management for seismic sensors, the method comprising:
   measuring seismic activity with a seismic sensor;
   comparing measured seismic activity from the seismic sensor against at least one criteria;
   when the measured seismic activity does not satisfy the at least one criteria, maintaining a signal processing circuit in a deactivated state;
   when the measured seismic activity satisfies the at least one criteria, activating the signal processing circuit and analyzing the measured seismic activity using the signal processing circuit; and
   entering a functional mode based on analyzing the measured seismic activity.

2. The method of claim 1, wherein comparing measured seismic activity from the seismic sensor against at least one criteria further comprises:
   comparing the measured seismic activity from the seismic sensor against a frequency criteria and an activity criteria.

3. The method of claim 2, wherein comparing the measured seismic activity from the seismic sensor against a frequency criteria and an activity criteria further comprises at least one of:
   determining if the measured seismic activity includes activity within a predefined frequency range;
   determining an intensity of the measured seismic activity; and
   determining a number of reoccurrences of seismic activities based on the measured seismic activity.

4. The method of claim 2, wherein comparing measured seismic activity from the seismic sensor against a frequency criteria and an activity criteria further comprises:
   establishing a seismic noise floor based on the seismic activity; and
   determining if the seismic noise floor comprises a predetermined range of acoustic frequencies.

5. The method of claim 1, wherein activating the signal processing circuit further comprises sending an activation interrupt signal to the signal processing circuit.

6. The method of claim 1, wherein analyzing the measured seismic activity using the signal processing circuit further comprises:
   performing a threat analysis; and
   selecting a response based on the threat analysis.

7. The method of claim 1, wherein entering a functional mode based on analyzing the measured seismic activity further comprises at least one of activating an alarm, initiating communication with a central data unit, and transmitting data regarding the measured seismic activity to the central data unit.

8. The method of claim 1 further comprising:
   restoring the signal processing circuit to a deactivated state based on analyzing the measured seismic activity.

9. The method of claim 1 further comprising:
   reconfiguring the at least one criteria based on instructions received from a central data unit.

10. The method of claim 2, wherein comparing measured seismic activity from the seismic sensor against a frequency criteria and an activity criteria is performed using an analog signal monitoring circuit; and
    wherein using an analog signal monitoring circuit further comprises:
       filtering an acoustic energy wave received at the seismic sensor for the seismic activity within a predefined range of acoustic frequencies.

11. An acoustic energy sensing device, the device comprising:
    a seismic sensor for receiving an acoustic energy wave; and
    a processing unit coupled to the seismic sensor, the processing unit comprising a power management module and a signal analysis module;
    wherein the power management module detects occurrences of one or more seismic activities within the acoustic energy wave at a predefined range of acoustic frequencies and identifies a seismic event of interest based on the one or more seismic activities;
    wherein when the power management module identifies a seismic event of interest, the power management module transmits an interrupt that triggers activation of the signal analysis module;
    wherein, upon activation, the signal analysis module evaluates the one or more seismic activities based on one or more action thresholds.

12. The device of claim 11, further comprising:
    a transceiver for communicating with at least one of a central data unit and another acoustic energy sensing device.

13. The device of claim 12, wherein the transceiver transmits data to the central data unit based on an evaluation of the one or more seismic activities performed by the signal analysis module.

14. The device of claim 11, wherein the power management module identifies a seismic event of interest based on at least one of:
   a prescribed period of time that seismic activity occurs within a predetermined frequency range;
   an intensity of measured seismic activity; and
   a number of reoccurrences of seismic activities based on measured seismic activity.

15. The device of claim 11, wherein the processing unit further comprises at least one of a microprocessor, a microcontroller, a field-programmable gate array, a field-programmable object array, a programmable logic device, and an application-specific integrated circuit.

16. An acoustic energy sensing device, the device comprising:
   a seismic sensor;
   a power manager coupled to the seismic sensor, the power manager receiving measurement signals from the seismic sensor representing one or more acoustic energy waves received by the seismic sensor; and
   a signal processor coupled to the seismic sensor and responsive to the power manager;
   the power manager further comprising:
      an activity trigger receiving the measurement signals and generating a first trigger signal based on activity parameters;
      a frequency filter receiving the measurement signals and filtering the measurement signals based on filter parameters;
      a frequency trigger receiving a first filtered measurement signal from the frequency filter and generating a second trigger signal;
      an activation module coupled to the activity trigger and the frequency trigger, wherein the activation module generates an activation interrupt based receiving at least one of the first trigger signal and the second trigger signal;
   the signal processor further comprising:
      a signal filter receiving the measurement signals and filtering the measurement signals based on filter parameters;
      an analog to digital converter receiving a second filtered measurement signal from the signal filter and sampling the second filtered measurement signal to generate digital measurement data;
      a signal analysis module responsive to the activation module, wherein the signal analysis module is activated from a sleep mode based on receiving the activation interrupt;
      wherein the signal analysis module analyzes the digital measurement data based on one or more action thresholds;
      wherein the signal analysis module deactivates when analysis of the digital measurement data determines that the one or more action thresholds are not satisfied;
      wherein the signal analysis module activates a functional mode when analysis of the digital measurement data determines that at least one of the one or more action thresholds are satisfied.

17. The device of claim 16, further comprising at least one memory, wherein the filter parameters and activity parameters are stored in the at least one memory.

18. The device of claim 16, wherein the activation module generates the activation interrupt when it receives both the first trigger signal and the second trigger signal.

19. The device of claim 16, wherein at least one of the filter parameters and activity parameters are based on at least one of:
   a prescribed period of time that seismic activity occurs within a predetermined frequency range;
   an intensity of measured seismic activity; and
   a number of reoccurrences of seismic activities based on measured seismic activity.

20. The device of claim 16, wherein upon activating the functional mode, the signal processor initiates additional functions including at least one of activating an alarm, initiating communication with a central data unit, and transmitting data regarding measured seismic activity to the central data unit.

* * * * *